United States Patent
Jenson et al.

(10) Patent No.: US 7,164,819 B2
(45) Date of Patent: Jan. 16, 2007

(54) SIDE-LIGHT EXTRACTION BY LIGHT PIPE-SURFACE ALTERATION AND LIGHT-EXTRACTION DEVICES EXTENDING RADIALLY BEYOND THE OUTER CLADDING

(75) Inventors: Chris H. Jenson, Twinsburg, OH (US); John M. Davenport, Middleburg Heights, OH (US); Roger F. Buelow, II, Gates Mills, OH (US); Brian Doucet, Akron, OH (US)

(73) Assignee: Fiberstars, Inc., Solon, OH (US)

( * ) Notice: Subject to any disclaimer, the term of this patent is extended or adjusted under 35 U.S.C. 154(b) by 112 days.

(21) Appl. No.: 10/797,383

(22) Filed: Mar. 10, 2004

(65) Prior Publication Data

US 2004/0179776 A1   Sep. 16, 2004

Related U.S. Application Data

(60) Provisional application No. 60/453,368, filed on Mar. 10, 2003.

(51) Int. Cl.
   *G02B 6/26*   (2006.01)
(52) U.S. Cl. ................................................ 385/39
(58) Field of Classification Search .................... 385/39
   See application file for complete search history.

(56) References Cited

U.S. PATENT DOCUMENTS

| 5,228,765 A | 7/1993 | Jones |
| 5,307,245 A | 4/1994 | Myers et al. |
| 5,406,641 A | 4/1995 | Bigley, Jr. et al. |
| 5,673,344 A * | 9/1997 | Li et al. ........................ 385/48 |
| 5,982,969 A | 11/1999 | Sugiyama et al. |
| 6,104,371 A * | 8/2000 | Wang et al. ................ 345/102 |
| 6,137,928 A * | 10/2000 | Albrecht ...................... 385/31 |

(Continued)

FOREIGN PATENT DOCUMENTS

JP       7-198950       8/1995

OTHER PUBLICATIONS

RD-390016-A, Sep. 1996, RD, Anon.*

(Continued)

*Primary Examiner*—Frank G. Font
*Assistant Examiner*—Timothy L. Rude
(74) *Attorney, Agent, or Firm*—Charles E. Bruzga; Bruzga & Associates (57) ABSTRACT

A light pipe with side-light extraction by light pipe-surface alteration includes an optical light pipe with a plastic light-carrying portion covered with a fluoropolymer cladding. A plurality of light-extraction devices is spaced along an active section of the light pipe for emission of side light over only a range from about 2 to 270 degrees of the cross-sectional circumference of the light pipe in the active section. The light-extraction devices have inlets passing through the cladding and optically contacting the plastic light-carrying portion. Another form of light pipe with side-light extraction by light pipe-surface alteration includes an optical light pipe with a plastic light-carrying portion. An active section of the light pipe for side light emission comprises an axisymmetrical change of area of cross section of the light pipe that generally diminishes from an inlet end of the active section, through the active section.

36 Claims, 6 Drawing Sheets

U.S. PATENT DOCUMENTS

| | | | |
|---|---|---|---|
| 6,304,693 B1 | 10/2001 | Buelow, II et al. | |
| 6,307,987 B1 * | 10/2001 | Wang et al. | 385/31 |
| 6,347,172 B1 * | 2/2002 | Keller et al. | 385/102 |
| 6,563,993 B1 * | 5/2003 | Imamura et al. | 385/123 |
| 6,597,834 B1 | 7/2003 | Hata | |

OTHER PUBLICATIONS

RD-388052-A, Jul. 1996, RD, Anon.*

2 Pages entitled "Uniglo Backlighting" from http://www.poly-optical.com/uniglo.html webpage (when last viewed on May 2, 2004) showing uniform extraction of light from a light guide—admitted as prior art.

2 Pages entitled "Design of Luxaura Light Guide" http://www.luxaura.com/tech.shtml webpage (when last viewed on May 2, 2004) showing light emitting in a radial swath—admitted as prior art.

Specification and drawings for U.S. Appl. No. 10/796,830, filed Mar. 9, 2004, for Light Pipe with Directional Side-Light Extraction by Roger F. Buelow II, John M. Davenport, and Chris Jenson. This application is copending with the present application and is assigned, or subject to assignment, to the same assignee as the present application.

Specification and drawings for U.S. Appl. No. 10/797,761, filed Mar. 10, 2004, for Light Pipe with Side Light Extraction by Roger F. Buelow II, Chris H. Jenson, and John M. Davenport. This application is copending with the present application and is assigned, or subject to assignment, to the same assignee as the present application.

Specification and drawings for U.S. Appl. No. 10/108,279, filed Apr. 18, 2005, for Efficient Luminaire with Directional Side-Light Extraction by William J. Cassarly, Thomas L.R. Davenport, John M. Davenport, and Chris H. Jenson. This application is copending with the present application and is assigned, or subject to assignment, to the same assignee as the present application.

* cited by examiner

SIDE-LIGHT EXTRACTION BY LIGHT PIPE-SURFACE ALTERATION AND LIGHT-EXTRACTION DEVICES EXTENDING RADIALLY BEYOND THE OUTER CLADDING

This application claims priority from Provisional Application No. 60/453,368 filed on Mar. 10, 2003.

FIELD OF THE INVENTION

The present invention relates to light pipes including means for extracting light from the side of the light pipe.

BACKGROUND OF THE INVENTION

Light pipe is used in two main ways. In an end-light application the light pipe is optimized to carry light along its length, and transmit it at the output face of the light pipe. In a side light application the light is extracted out the side of the light pipe and provides illumination along its length. Often, light extracted from the side of a light pipe over the full 360 degrees about the light pipe axis is undesirable because a reflector would be needed to redirect a significant portion of the light towards the intended area to be illuminated. Some of the redirected light impinges on the light pipe and may be either absorbed into the light pipe so as to reduce side-light output, or is scattered into unintended directions. This is the same drawback associated with fluorescent lighting and results in an inefficient fixture for delivering light onto the desired surface.

It would be desirable to eliminate the inefficient fixture and reflector combination for use with a light pipe by extracting the light only in the desired direction, towards a target area to be illuminated.

Alternatively, in a second embodiment of the invention, with a light pipe lacking a fluoropolymer cladding, it would be desirable to provide novel ways of extracting the light from the side of the light pipe.

SUMMARY OF THE INVENTION

A first embodiment of the invention provides a light pipe with side-light extraction by light pipe-surface alteration, which includes an optical light pipe with a plastic light-carrying portion covered with a fluoropolymer cladding. A plurality of light-extraction devices is spaced along an active section of the light pipe for emission of side light over only a range from about 2 to 270 degrees of the cross-sectional circumference of the light pipe in the active section. The light-extraction devices have inlets passing through the cladding and optically contacting the plastic light-carrying portion.

The foregoing light pipe eliminates the inefficient fixture and reflector combination of fluorescent lamps, for instance, by extracting the light only in the desired direction, towards a target area to be illuminated.

A second embodiment of the invention provides a light pipe with side-light extraction by light pipe-surface alteration, which includes an optical light pipe with a plastic light-carrying portion. An active section of the light pipe for side light emission comprises an axisymmetrical change of area of cross section of the light pipe that generally diminishes from an inlet end of the active section, through the active section the further the distance along the light pipe from a light source.

The foregoing embodiment of the invention provides novel ways of extracting the light from the side of the light pipe.

DESCRIPTION OF THE DRAWINGS

FIG. 4b is a fragmentary, perspective view showing an alternative piece of material for use in the light pipe of FIG. 4a.

DETAILED DESCRIPTION OF THE INVENTION

This description covers the three points of (1) a first embodiment of the invention in which side light is extracted only in a desired direction, (2) a second embodiment in which side light is extracted in a novel way around the entire 360 degree about the light pipe, and (3) manufacturing details for the foregoing embodiments.

1. First Embodiment—Directional Side-Light Extraction

Figure 1:
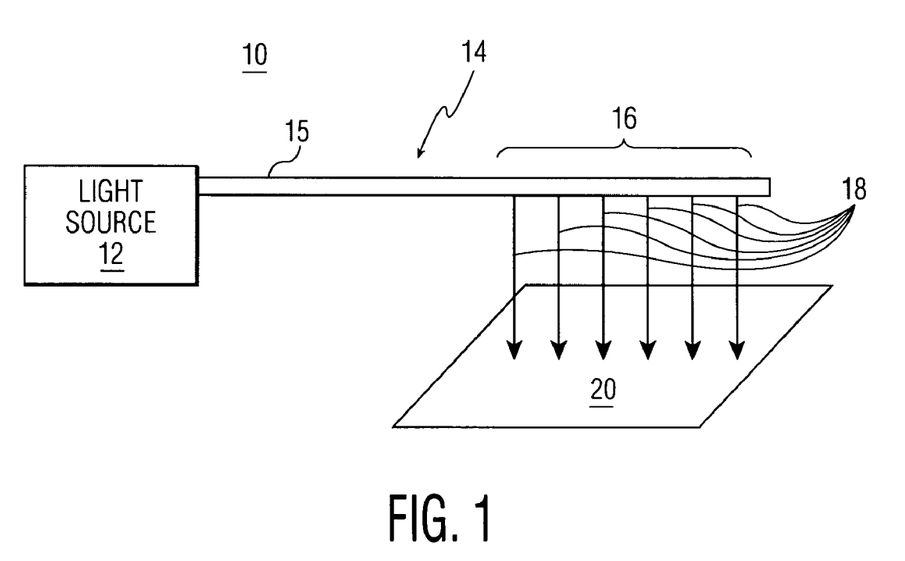
FIG. 1 is a simplified side view of a sidelight illumination system in accordance with the present invention.

FIG. 1 shows a sidelight illumination system 10 in which a light source 12 delivers light to a light pipe 14, which has a section 15 that does not emit side light and an active section 16 for emitting side light. In a first embodiment of the invention, the side light emitted shines in the direction of arrows 18 toward a target area 20 to be illuminated. In a second embodiment of the invention, the side light is directed around the full 360 degree swath around the longitudinal axis of the light pipe in a novel manner. In either embodiment, active section 16 for emitting side light comprises either a fraction of, or the entirety of, light pipe 14. In the latter circumstance, light pipe 14 does not include a section 15 that does not emit side light.

Figure 2:
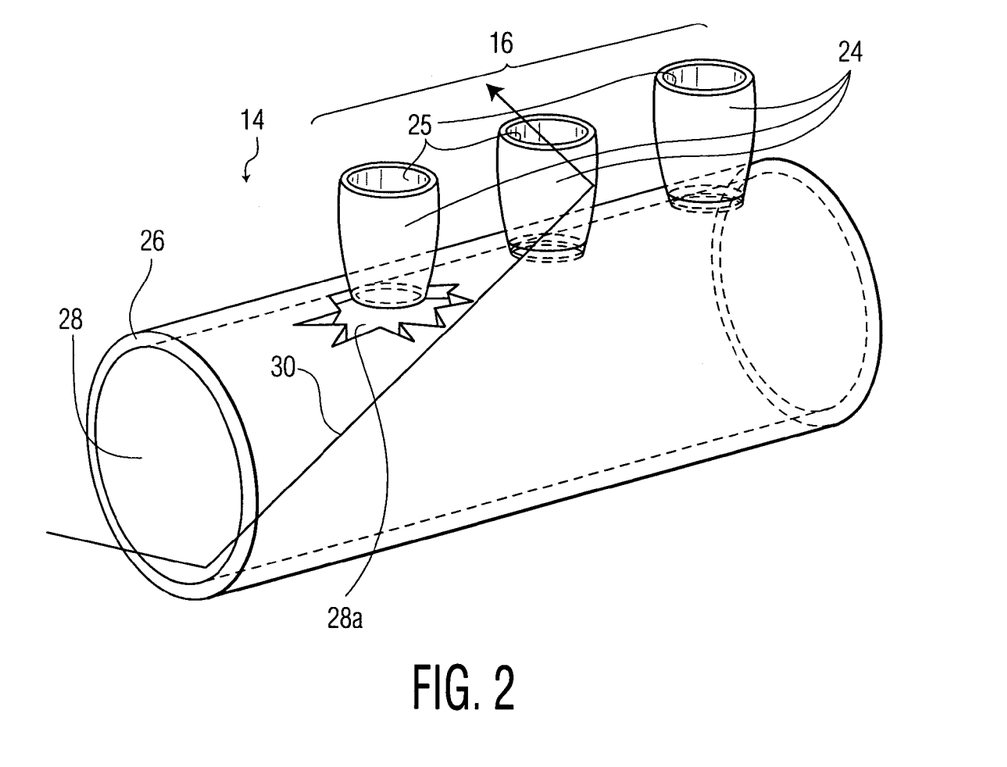
FIG. 2 is an enlarged, perspective view, partially cutaway, of a light pipe incorporating a series of optical elements for directional side light-extraction.

FIG. 2 shows a light pipe 14 with an active section 16 for side-light emission. Active section 16 contains a series of optical elements 24 that penetrate a fluoropolymer clad 26 of the light pipe and optically contact a core 28 of acrylic polymer, for instance, of the pipe. Such optical contact may be better appreciated from the cutaway portion 28a of the core. By "optically contact" is meant that elements 24 are connected with the core in such a way that a light ray (not shown) can travel effortlessly from core to optical element without passing through an intermediate material having a refractive index different from that of the core or of the optical element. Elements 24 may be connected to the core with an appropriate index-matching adhesive. Elements 24 may be hollow and with or without an interior reflective surface 25, or they may be solid. Preferably, they are made by die casting or injection molding of plastic for economy.

FIG. 2 also shows how a light ray 30 travels down light pipe 14 with optical elements 24 present. When light ray 30 makes contact with an optical element 24, it is extracted out the side of the pipe and is directed according to the shape of the optical element. The collective distribution of side light in active section 16 is determined by the shape and location of optical elements 24 along the length of active section 16. The shape and concentration of the elements could be constant or vary along the length of the light pipe.

Regarding FIG. 2, for a typical light pipe 14 having a 6- to 25-mm core diameter (e.g., 19 mm), an optical element may have a diameter (along the length of the pipe) of about 5 mm. Further, optical elements 24—only a few of which are shown—might occupy a range of between about 2 and 270 degrees around a longitudinal axis of the light pipe. More preferably the range is below about 180 degrees, more preferably below about 90 degrees, and still more preferably below about 45 degrees. On the other hand, the range is preferably greater than 10 degrees, and more preferably more than about 30 degrees. One shape for an optical element would be that of a so-called angle-to-area converter, in which each element increases in cross-sectional area from inlet to outlet in such manner as to reduce the angle of light passing through the device. A preferred angle-to area converter comprises a compound parabolic concentrator (CPC) shape. A CPC shape is described in detail in, for instance, W. T. Welford and R. Winston, High Collection Nonimaging Optics, New York: Academic Press, Inc. (1989), chapter 4 (pp. 53–76).

Figure 3A:
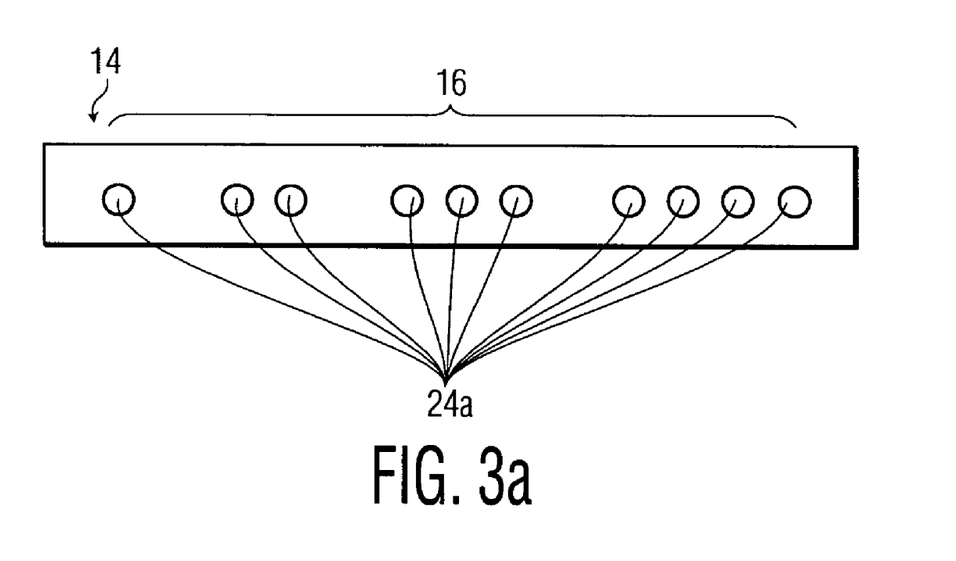
FIG. 3a is a side plan view of a light pipe having optical elements as in FIG. 2 but arranged in a different pattern.
Figure 3B:
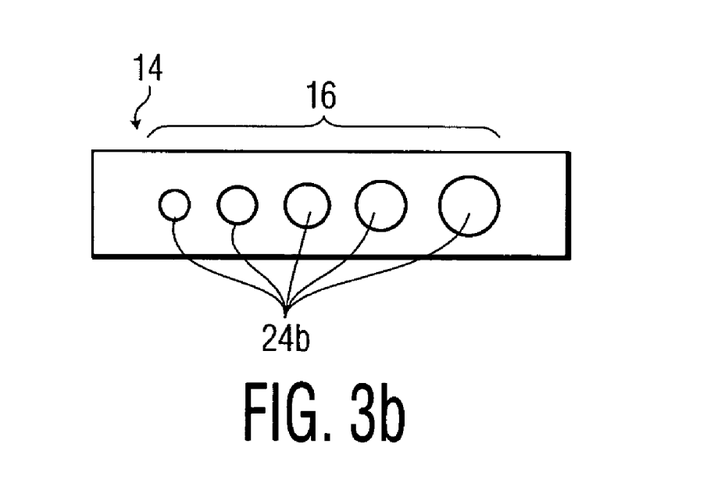
FIG. 3b is a side plan view of a light pipe having optical elements as in FIG. 2 but having differing sizes.

To achieve uniform side-light emission in active section 16, optical elements 24 may be distributed in a sequentially increasing density along the active section, from the inlet to such section (which receives light ray 30). For instance, FIG. 3a shows such an arrangement of sequentially increasing density of optical elements 24a in active section 16 of light pipe 14. Alternatively, as shown in FIG. 3b, to achieve uniform side-light emission, the sizes of optical elements 24b may increase along the length of active section 16 of light pipe 14 from inlet to outlet. The approaches of FIGS. 3a and 3b can be combined to achieve uniform side-light emission. As used herein, "uniformity" in side-light emission means that the lumen output as between inlet and outlet portions of a side-light emitting section of the light pipe is within plus or minus 20 percent of the average value of each other. More uniformity than this may also be desirable in some circumstances. The increases in size or density of the optical elements does not need to occur along the entire length of the active side-light section.

Beneficially, the optical elements of FIG. 2, for instance, can be concentrated in a relatively short section of the light pipe, so that the elements extract a majority of light from the light pipe over a relatively short section. This creates a bright region of directed illumination.

Figure 4A:
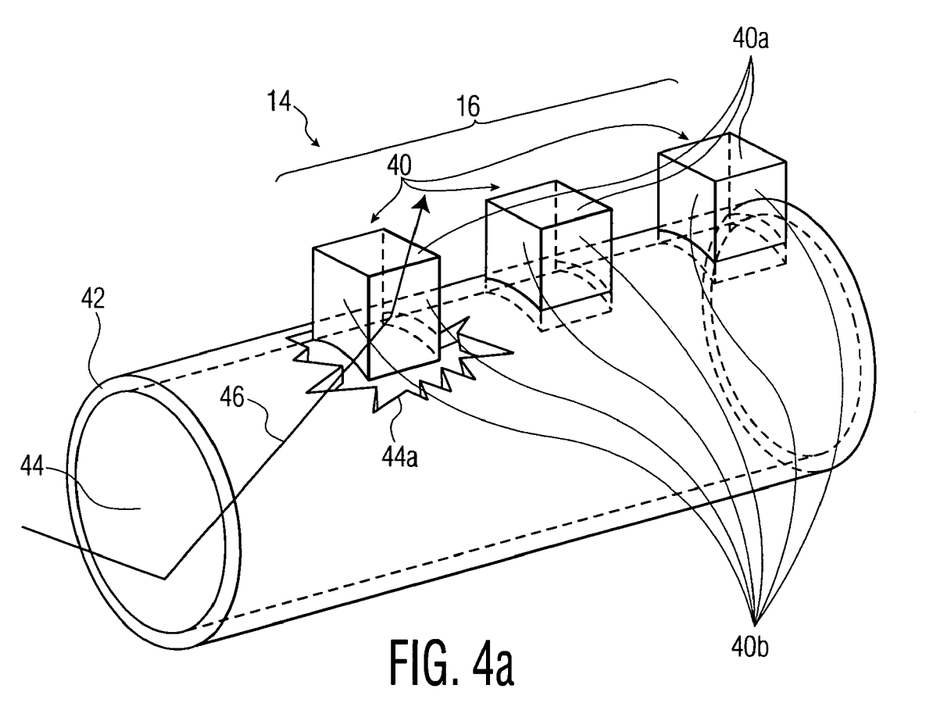
FIG. 4a is an enlarged, perspective view, partially cutaway, of a light pipe incorporating pieces of material with a refractive index at least as high as that of the core of the light pipe for directional side light-extraction.

FIG. 4a shows a light pipe 14 having pieces 40 of material in active section 16 for side-light emission. For a typical light pipe 14 having a 6- to 25-mm core diameter (e.g., 19 mm), a piece 40 may have a dimension (along the length of the pipe) of about 5 mm. Pieces 40—only a few of which are shown—might occupy a range of between about 2 and 270 degrees around a longitudinal axis of the light pipe. More preferably the range is below about 180 degrees, more preferably below about 90 degrees, and still more preferably below about 45 degrees. On the other hand, the range is preferably greater than 10 degrees, and more preferably more than about 30 degrees. Pieces 40 of material penetrate clad 42 and optically contact core 44, of acrylic polymer, for instance, as shown best at the cutaway portion 44a of the core. The term "optically contact" is defined above. Preferably, pieces 40 optically contact the core in the same way as described above with respect to optical elements 24 of FIG. 2. Pieces 40 have an index of refraction at least as high as that of core 44, and may comprise die-cast, or injection-molded, plastic such as acrylic polymer 24. When a light ray such as 46 travels down light pipe 14 and reaches the interface between core 44 and a piece 40, the piece extracts the light ray by refraction from the side of the light pipe.

In FIG. 4a, the distribution of side light from light pipe 14 depends on the geometry of the pieces 40, their index of refraction, and their location. The shape and concentration of pieces 40 could be constant or vary along the length of the light pipe. Preferably, surfaces 40a of pieces 40 that face radially away from the light pipe are rectangular (e.g., square). Preferably, the side surfaces of the pieces, e.g., surfaces 40b, form right angles with surfaces 40a, so as to limit total internal reflection within the pieces, which might reflect the light back into the light pipe. Preferably, surfaces 40a constitute flat surfaces, parallel to the longitudinal axis of light pipe, as shown in FIG. 4a.

Figure 4B:
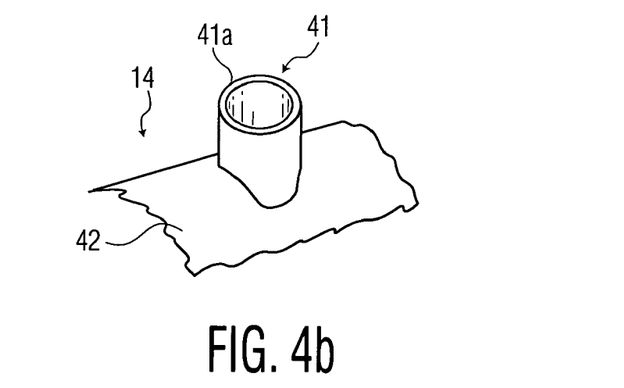

Alternatively, FIG. 4b shows a light pipe 14 having a piece 41 of material that is cylindrical, and oriented orthogonal to the length, or longitudinal axis, of the light pipe. Preferably, piece 41 has a flat, upper surface 41a, as shown, that is parallel to the longitudinal axis of the light pipe. Of course, more than one piece 41 may be used.

Figure 5A:
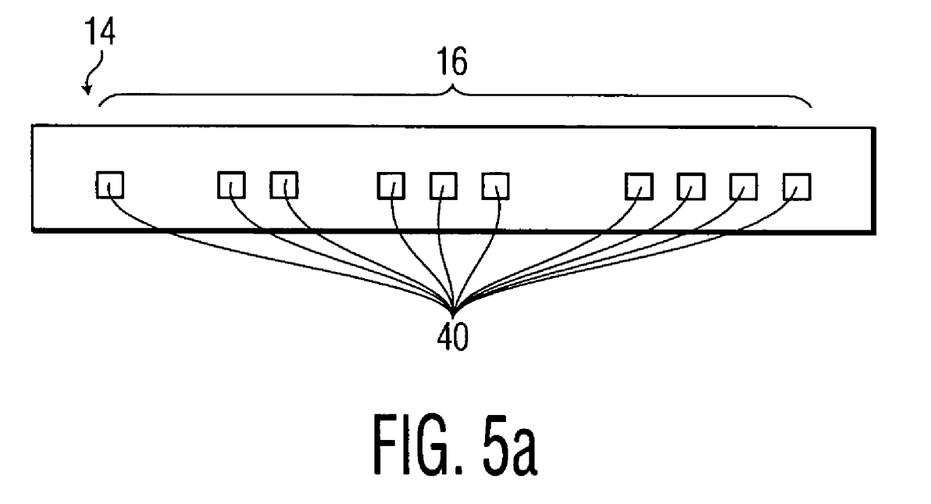
FIG. 5a is a side plan view of a light pipe incorporating pieces of material as in FIG. 4a but that are arranged in a different pattern.
Figure 5B:
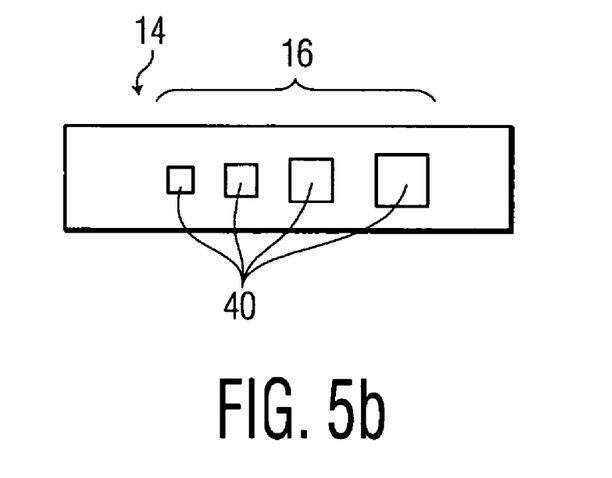
FIG. 5b is a side plan view of a light pipe incorporating pieces of material as in FIG. 4a but that have differing sizes.

To achieve uniform side-light emission in active section 16, pieces 40 may be distributed in a sequentially increasing density along the active section, from the inlet of such section (which receives light ray 46). For instance, FIG. 5a shows such an arrangement of sequentially increasing density of pieces 40 in active section 16 of light pipe 14. Alternatively, FIG. 5b shows pieces 40 that increase in size from inlet to outlet of active section 16 to achieve uniformity of light emission. Or, some combination of the approaches of FIGS. 5a and 5b could be used to achieve uniformity of side-light emission. The increases in size or density of the optical elements does not need to occur along the entire length of the active side-light section. The foregoing distribution of pieces 40 applies equally well to pieces 41, for instance.

With a predetermined placement of pieces 40 material along the length of light pipe 14, side-light section 16 extracts a given amount of light along the length of the light pipe which is directed towards a surface to be illuminated. This is useful in illuminating a specific surface (e.g., 20, FIG. 1).

2. Second Embodiment—Novel Side-Light Extraction for 360°

A second embodiment of the invention concerns a novel way to extract light from the full 360 degrees about the longitudinal axis of a light pipe.

In general terms, light can be extracted from a light pipe by altering the shape of the light pipe and creating points or areas where light traveling in the light pipe will exceed the critical angle for total internal reflection (TIR) at the surface of the core. Light exceeding the critical angle for TIR will exit from the side of the light pipe instead of transmitting along the length of the pipe. Light can be extracted in a uniform and even manner along the length of a given section of light pipe, through suitable selection of the spacing and size of predetermined decreases in diameter. At each area where the diameter is decreased (in a stepwise manner), light will be removed from the light pipe. Design of these areas-which will be apparent to those of ordinary skill in the art from the present specification-will dictate the amount of light extracted at each diameter decrease as one moves along the length of the light pipe.

Figure 6:
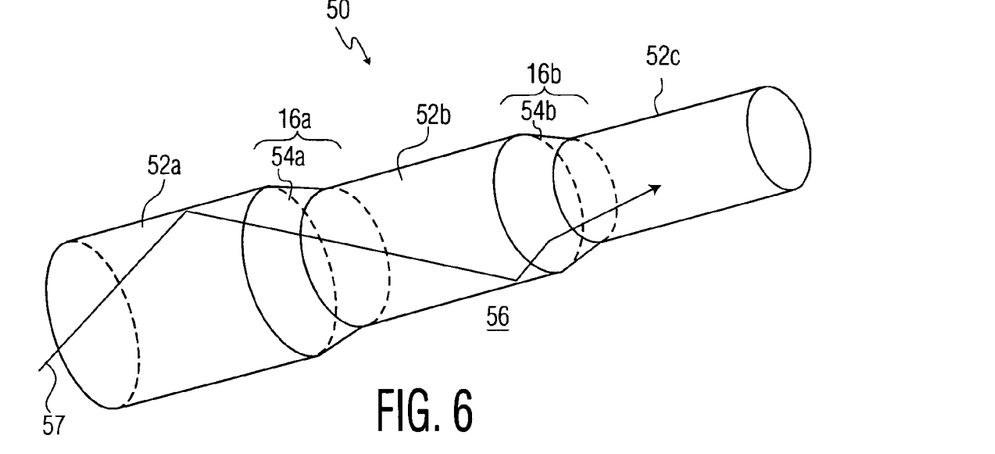
FIG. 6 is a perspective view of a light pipe having discrete regions in which side-light is extracted in accordance with a second embodiment of the invention.

Thus, FIG. 6 shows a light pipe 50 having respectively uniform cross-sectioned regions 52a, 52b and 52c, and linearly tapered regions 54a and 54b in side-light extraction areas 16a and 16b. Light pipe 50 comprises a plastic core, such as acrylic polymer, and is free of a fluoropolymer clad. Instead, ambient air 56 with a lower refractive index than the plastic core enables the light rays to totally internally reflect (TIR) as they propagate down the light pipe, at least in regions 52a–52c of uniform cross-section.

A light ray 57 entering region 52a reflects on the side of regions 52a and 52b by total internal reflection (TIR), but upon reaching tapered region 54a the ray exceeds the critical angle for TIR and is extracted from the side of the light pipe. In this way, tapered regions 54a–54b cause light to be extracted from the side of the light pipe. A coating (not shown) such as an anti-reflection coating may be applied to tapered regions 54a and 54b to aid the extraction of light. Alternatively, a coating (not shown) could be applied to these tapered regions to hinder the extraction of light. Such coatings will be apparent to those of ordinary skill in the art based on the present specification.

In the embodiment of FIG. 6, the distribution of side light is determined by length of the transitions of tapered regions 54a and 54b from larger to smaller diameters, the change in diameter of light pipe 50 before and after the transition, and the frequency of such transitions along the length of the light pipe. The shape and concentration of the transitions could be constant or vary along the length of the light pipe.

Figure 7:
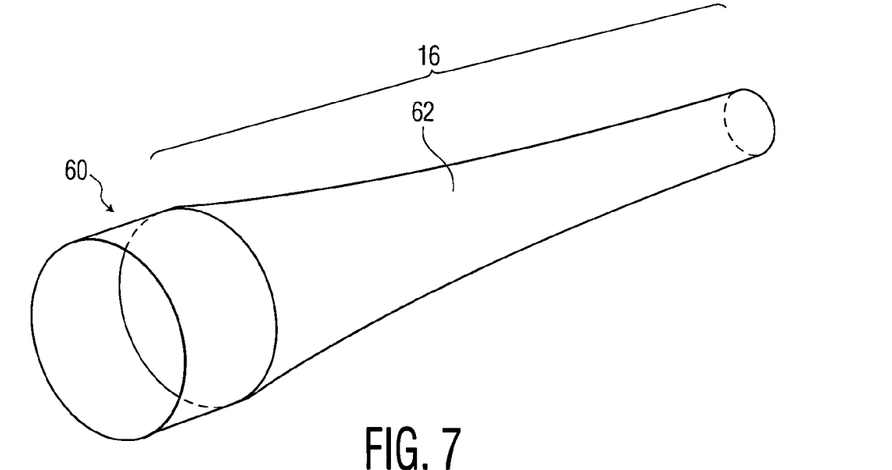
FIG. 7 is a perspective view of a light pipe having a tapered region for extracting side light in accordance with a second embodiment of the invention.

FIG. 7 shows a light pipe 60 having a region 62 with a downwardly tapering cross section in section 16 for side-light emission. The taper in region 62 is non-linear, preferably to achieve uniformity in side-light emission. Light pipe 60 operates in similar manner to light pipe 50 of FIG. 6, but instead has one continuous taper in region 62. Portions of region 62 with the greatest taper extract more light assuming the same input light level. However, as light is extracted along the length of a light pipe, less light is available to be extracted, and hence an increasingly greater taper is desired the greater the distance from an inlet to a side-light emitting section.

Light pipe 50 of FIG. 6 could incorporate non-linear tapers such as shown in FIG. 7, to achieve a desired light output.

Figure 8:
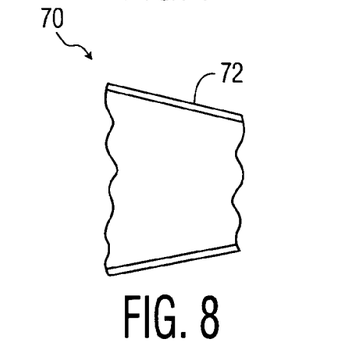
FIG. 8 is a fragmentary side view of a portion of a tapered region of FIG. 6 or 7.

FIG. 8 shows a portion of a tapered region 70—from FIG. 6 or 7—on which a coating 72 which either hinders light emission or helps light emission. Coating 72, which may be placed on selected tapered regions, gives the designer an additional factor to control light emission. Selection of a suitable coating 72 will be apparent to persons of ordinary skill in the art.

Two issues arise for selecting a discrete tapers versus a continuous taper for the light pipe of FIGS. 6 and 7. In a light pipe with a relatively short length (e.g., 1 meter) of active side-light section, for instance, it would be desirable for uniform output to have a non-linear taper over the entire active section. However, if discrete points of light are desired, such as in a long ceiling fixture, the discrete tapers would be required. For uniformity of the amount of light extracted from various points of extraction, however, the amount of taper or the linearity of the taper may need to be varied according to the principles expressed herein for both the first embodiment and the current (second) embodiment. Thus, for instance, with reference to FIG. 5a, the density of spacing of regions of side-light extraction can become higher, the further the distance from the light input.

3. Manufacturing Concerns

Optical elements 24 of FIG. 2 and pieces 40 of material of FIG. 4a, for example, could be manually inserted onto a core of a light pipe. Preferably, however, optical elements 24 and pieces 40 are inserted onto the core of a light pipe in a continuous extrusion process for making light pipe. A cross-head die or co-extrusion die could be used, for instance. In such process, a wheel (not shown) could punch holes through still-molten clad material, downstream of the die to remove the clad. A second wheel (not shown) then continuously positions optical elements or pieces of material directly on the still-molten core, downstream of the die. At this point, the core is still relatively fluid, so the elements or pieces can adhere, preferably directly to core. Thereafter, the core could undergo further steps such as cross-linking if that process has not occurred earlier.

The second embodiment of the invention, involving multiple discrete downward taperings, or a single continuous, downward tapering, of the cross section of a light pipe can be made by casting or injection molding. This also applies to light pipes such as pipe 14 of FIG. 1 that includes a section 15 that does not emit side light and an active section 16 for emitting side light.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A light pipe with side-light extraction by light pipe-surface alteration, comprising:
    a) an optical light pipe with a plastic light-carrying portion covered with a fluoropolymer cladding; the light pipe having a longitudinal axis; and
    b) a plurality of light-extraction devices in an arrangement including being spaced along a longitudinal dimension of an active section of the light pipe for emission of side light over only a range from about 2 to 270 degrees of the cross-sectional circumference of the light pipe in the active region;
    c) the light-extraction devices extending, with respect to the longitudinal axis, radially beyond an outer surface of the fluoropolymer cladding; and
    d) the light-extraction devices having inlets passing through the cladding and optically contacting the plastic light-carrying portion.

2. The light pipe of claim 1, wherein the light-carrying portion comprises acrylic polymer.

3. The light pipe of claim 1, wherein the light-extraction devices comprise a plurality of optical elements spaced along the length of the light pipe and having inlets passing through the cladding and optically contacting the light-carrying portion.

4. The light pipe of claim 3, wherein the range is between about 30 and 90 degrees.

5. The light pipe of claim 3, wherein the light-carrying portion comprises acrylic polymer.

6. The light pipe of claim 3, wherein the density of light-extraction devices increases sequentially along the length of the light pipe the further the distance along the light pipe from a light source.

7. The light pipe of claim 3, wherein each device increases in cross sectional area from inlet to outlet in such manner as to reduce the angle of light passing through the device.

8. The light pipe of claim 7, wherein each optical element comprises an interior light-reflective surface for receiving light from the inlet and transmitting it to an outlet.

9. The light pipe of claim 1, wherein the light-extraction devices comprise respective pieces of material with a refractive index at least as high as that of the light-carrying portion; the pieces passing through the cladding and optically contacting the plastic light-carrying portion.

10. The light pipe of claim 9, wherein the light-carrying portion comprises acrylic polymer.

11. The light pipe of claim 9, wherein the pieces have a substantially flat, rectangular surface facing radially away from the light pipe.

12. The light pipe of claim 11, wherein side surfaces of the pieces adjoin the substantially flat surface substantially at a right angle.

13. The light pipe of claim 12, wherein the substantially flat surface is substantially parallel to a longitudinal axis of the light pipe.

14. The light pipe of claim 9, wherein the pieces are substantially cylindrical and have longitudinal axes substantially perpendicular to the longitudinal axes of the light pipe.

15. The light pipe of claim 14, wherein the substantially cylindrical pieces have a substantially flat surface facing radially away from the light pipe and aligned substantially parallel to the longitudinal axis of the light pipe.

16. The light pipe of claim 9, wherein the density of light-extraction devices increases sequentially along the length of the light pipe.

17. The light pipe of claim 1, wherein the light-extraction occurs mainly through refraction of light at an interface between the light-carrying portion and the devices, other than by refraction through any light-scattering particles in the devices.

18. The light pipe of claim 1, wherein the devices have a substantially flat surface facing radially away from the light pipe.

19. A light pipe with side-light extraction by light pipe-surface alteration, comprising:
 a) an optical light pipe with an acrylic polymer light-carrying portion covered with a fluoropolymer cladding; the light pipe having a longitudinal axis; and
 b) a plurality of light-extraction devices in an arrangement including being spaced along a longitudinal dimension of an active section of the fight pipe for emission of side light over only a range less than about 180 degrees of the cross-sectional circumference of the light pipe in the side light region;
 c) the light-extraction devices comprising a plurality of optical elements spaced along the length of the light pipe and having inlets passing through the cladding and optically contacting the plastic light-carrying portion; and
 d) the light-extraction devices extending, with respect to the longitudinal axis. radially beyond an outer surface of the fluoropolymer cladding; and
 e) the light-extraction devices being spaced along the length of the light pipe with a density that increases sequentially along the length of the light pipe the further the distance along the light pipe from a light source.

20. The right pipe of claim 19, wherein the range is no more than about 45 degrees.

21. The light pipe of claim 20, wherein the range is no less than about 30 degrees.

22. The light pipe of claim 19, wherein the diameter of the light-carrying portion is between about 6 mm and 25 mm.

23. The light pipe of claim 19, wherein each device increases in cross sectional area from inlet to outlet in such manner as to reduce the angle of light passing through the device.

24. The light pipe of claim 23, wherein each optical element comprises an interior light-reflective surface for receiving light from the inlet and transmitting it to an outlet.

25. The light pipe of claim 19, wherein the devices have a substantially flat surface facing radially away from the light pipe.

26. A light pipe with side-light extraction by light pipe-surface alteration, comprising:
 a) an optical light pipe with an acrylic polymer light-carrying portion covered with a fluoropolymer cladding; the light pipe having a longitudinal axis; and
 b) a plurality of light-extraction devices in an arrangement including being spaced along a longitudinal dimension of an active section of the light pipe for emission of side light over only a range less than about 180 degrees of the cross-sectional circumference of the light pipe in the side light region;
 c) the light-extraction devices extending, with respect to the longitudinal axis, radially beyond an outer surface of the fluoropolymer cladding; and
 d) the light-extraction devices comprising respective pieces of material with a refractive index at least as high as that of the plastic light-carrying portion; the pieces passing through the cladding and optically contacting the plastic light-carrying portion; and
 e) the light-extraction devices being spaced along the length of the light pipe with a density that increases sequentially along the length of the light pipe the further the distance along the light pipe from a light source.

27. The light pipe of claim 26, wherein the range is no more than about 45 degrees.

28. The light pipe of claim 27, wherein the range is more than about 30 degrees.

29. The light pipe of claim 26, wherein the diameter of the light-carrying portion is between about 6 and 25 mm.

30. The light pipe of claim 26, wherein the pieces have a substantially flat, rectangular surface facing radially away from the light pipe.

31. The light pipe of claim 30, wherein side surfaces of the pieces adjoin the substantially flat surface substantially at a right angle.

32. The light pipe of claim 31, wherein the substantially flat surface is substantially parallel to a longitudinal axis of the light pipe.

33. The light pipe of claim 26, wherein the pieces are substantially cylindrical and have longitudinal axes substantially perpendicular to the longitudinal axes of the light pipe.

34. The light pipe of claim 33, wherein the substantially cylindrical pieces have a substantially flat surface facing radially away from the light pipe and aligned substantially parallel to the longitudinal axis of the light pipe.

35. The light pipe of claim 26, wherein the light-extraction occurs mainly through refraction of light at an interface between the light-carrying portion and the devices, other than by refraction through any light-scattering particles in the devices.

36. The light pipe of claim 26, wherein the devices have a substantially flat surface facing radially away from the light pipe.

* * * * *

UNITED STATES PATENT AND TRADEMARK OFFICE
CERTIFICATE OF CORRECTION

| | |
|---|---|
| PATENT NO. | : 7,164,819 B2 |
| APPLICATION NO. | : 10/797383 |
| DATED | : January 16, 2007 |
| INVENTOR(S) | : Jenson et al. |

It is certified that error appears in the above-identified patent and that said Letters Patent is hereby corrected as shown below:

Column 1, after line 8 insert:

GOVERNMENT INTEREST

This invention was made with Government support under Agreement Number DAAH01-03-9-R001 awarded by the U.S. Army Aviation and Missile Command. The Government has certain rights in the invention.

Signed and Sealed this

Nineteenth Day of August, 2008

JON W. DUDAS
*Director of the United States Patent and Trademark Office*